United States Patent [19]

Williams

[11] Patent Number: 5,162,992

[45] Date of Patent: Nov. 10, 1992

[54] VECTOR RELATIONAL CHARACTERISTICAL OBJECT

[75] Inventor: Marvin L. Williams, Lewisville, Tex.

[73] Assignee: International Business Machines Corp., Armonk, N.Y.

[21] Appl. No.: 454,797

[22] Filed: Dec. 19, 1989

[51] Int. Cl.⁵ ............................................. G06F 15/00
[52] U.S. Cl. ..................................... 364/419; 395/600
[58] Field of Search ........................ 364/200, 900, 419

[56] References Cited

U.S. PATENT DOCUMENTS

| | | | |
|---|---|---|---|
| 4,803,614 | 2/1989 | Banba et al. | 364/200 |
| 4,811,199 | 3/1989 | Kuechler | 364/200 |
| 4,817,036 | 3/1989 | Miller | 364/900 |
| 4,905,163 | 2/1990 | Garber | 364/513 |

FOREIGN PATENT DOCUMENTS

| | | |
|---|---|---|
| 0157539 | 3/1985 | European Pat. Off. . |
| 0229232 | 9/1986 | European Pat. Off. . |

Primary Examiner—Dale M. Shaw
Assistant Examiner—Andrew Bodendorf
Attorney, Agent, or Firm—David A. Mims, Jr.; James H. Barksdale

[57] ABSTRACT

This invention relates to a method of identifying attributes when documents are grouped to form document relationships within a document management system. Document groupings frequently require the identification of all documents within the relationship with a particular attribute. However, when individual documents store attributes along with document contents, individual querying of each document is required when the information is sought later. This invention provides a Vector Relational Characteristical Object, available to access mechanisms, and containing fields to identify a particular attribute. Each field in the Vector Relational Characteristical Object is followed by an identifier which uniquely identifies the document which possess the particular attribute.

3 Claims, 4 Drawing Sheets

| ATTRIBUTE-X | DOC-1 | DOC-2 | DOC-3 | ATTRIBUTE-Y | DOC-1 | DOC-2 | DOC-6 ••• |

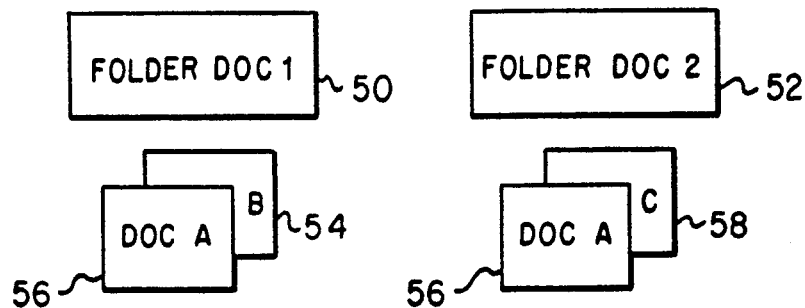
FIG. 3
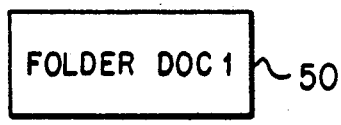
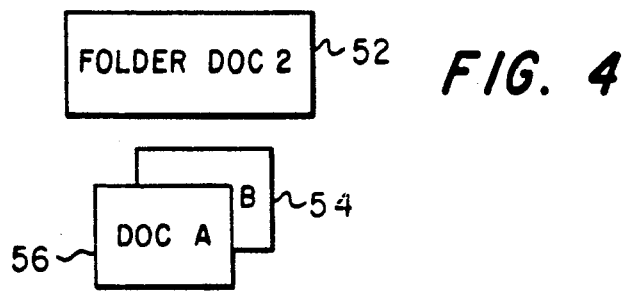
FIG. 4
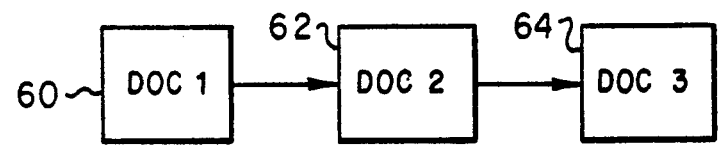
FIG. 5
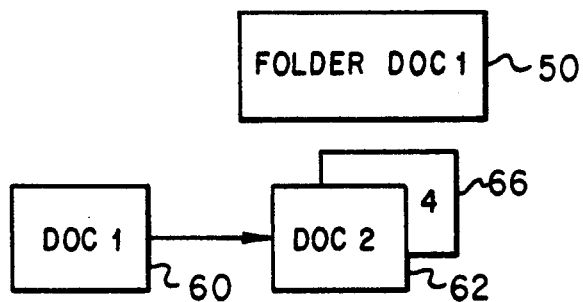
FIG. 6
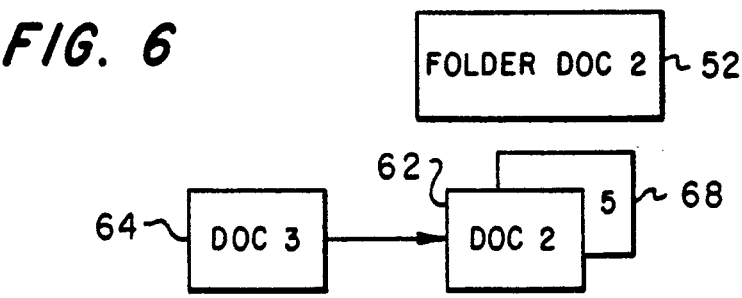

VECTOR RELATIONAL CHARACTERISTICAL OBJECT

FIELD OF THE INVENTION

This invention relates to a method of managing documents in an information processing system and more particularly, to a method of rapidly identifying documents having the same attributes in a shared library.

BACKGROUND OF THE INVENTION

The electronic office has resulted in the grouping of documents into relationships intended to aid in electronically storing, searching, and retrieving the documents. Use of document libraries represent one technique for meeting this need. As currently implemented, these document libraries offer functions analogous to manual filing and retrieving of paper documents, but in a far less cumbersome manner. One prior art structure which meets the need for electronically storing. Searching and retrieving documents is the Document Interchange Architecture (DIA) which is part of an office system marketed by the International Business Machines Corporation. The DIA document structure provides a set of descriptors for each document filed in a library. These descriptors are placed in document profiles and are filed with the documents. The document profiles contain parameters identifying the contents of the documents, such as the name under which it is filed, the authors, the subject it covers, and the date it was filed in the document library.

The document profiles are used in searching for documents in the document library. For example, a user can ask for all documents about a particular subject, by a certain author, that the library received between two dates. Upon completing the search, the user would be given a list of documents that met the search criteria. A user or end user may be a person, device, program, or computer system that utilizes the library for data processing and information exchange.

In addition to retrieving documents based on specific search criteria, the DIA document library service provides for the formation of relationships between documents. These document relationships were originally conceived by M. G. Macphail and disclosed in co-pending application Ser. No. 07/454,797, entitled "A Method of Filing Stapled Documents within an Application", which is incorporated herein by reference.

One example of such a document relationship is the concept of folder documents. A folder document is created when a user groups documents into a linear or hierarchical structure. Documents assume a linear structure when they are organized by placing a set of documents in a user specified position within a particular folder. Documents can assume a hierarchical structure by nesting documents that are folders, or more simply, putting a document that is itself a folder into another document that is a folder. Each document in a folder, regardless of its relationship with other documents, has separate document definitions including descriptors, access control, and document content. Therefore, access to one document contained within a particular relationship implies nothing with respect to access to other documents within the same relationship. All documents in the DIA document library have a Library Model Object, called the Document Relation Object, associated with them that describes the document relationships. Therefore, when there is a need to access a folder, each Document Relation Object for each document in a folder must be accessed to determine the complete relationship between the documents.

Another example of a document relationship allowed in a DIA library is the staple relationship. The staple relationship allows a user to attach two documents together. Staple relationships provide a tightly bound, directed, one-to-one document relationship between documents. In addition, the stapled documents can be placed within a folder document. The Document Relation Object for each of the documents as previously described for folder documents, must describe the relationship between the stapled documents as well as the relationship between the folder documents. Thus, each document within the relationship contains its own particular attributes such as language, document type, character sets and other profile information which describes the characteristics of the document itself. For example, if all documents in a relationship were composed in French, each document would have profile information specifying that the document was in French.

Any user seeking to access the documents defined by the relationship, would have to read and decipher each document's profile to determine the attributes of all documents within the relationship. Consequently, what is needed is a means to specify the attributes once, and to identify all documents within a relationship which contain those particular attributes.

SUMMARY OF INVENTION

This invention relates to a method of reducing storage requirements and complexity in a document management system when specifying attributes that occur multiple times in a plurality of documents. Document management systems store attributes such as language, document type, and character sets with the document contents. When individual documents are combined with other documents to create relationships such as folders or stapled documents, each individual document must be queried to determine its attributes. This invention discloses a Vector Relational Characteristical Object created when a relationship is defined between two or more documents. This Vector Relational Characteristical Object contains a field to identify a particular attribute for at least one document in the relationship. The Vector Relational Characteristical Object is available to document access mechanisms for rapid determination of document attributes without the need for scanning each individual document in the relationship for its attributes.

BRIEF DESCRIPTION OF THE DRAWINGS

FIG. 3 is a block diagram of a document relationship illustrating the concept of folder documents.

FIG. 4 is a block diagram of a folder relationship showing a folder in another folder.

FIG. 5 is a block diagram of a staple relationship.

FIG. 6 is a block diagram of stapled documents within a folder.

DETAILED DESCRIPTION

Figure 1:
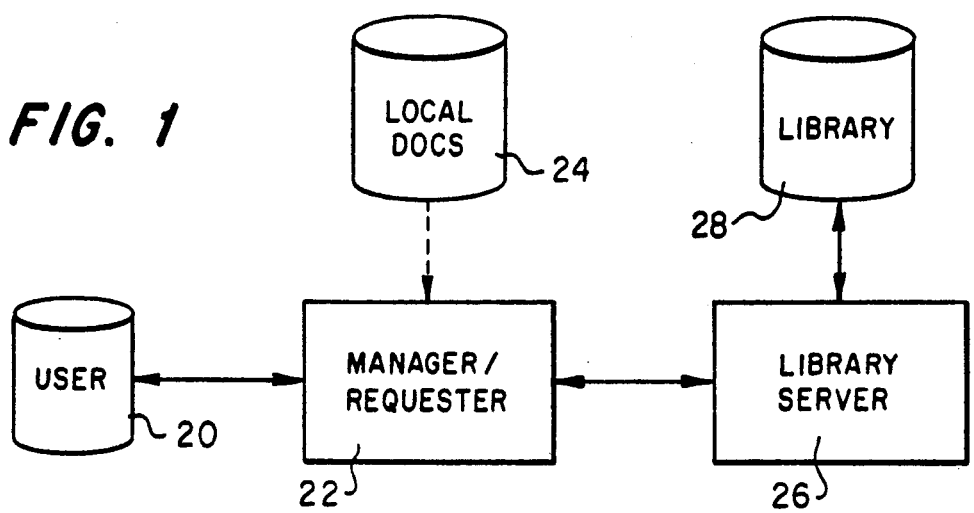
FIG. 1 is a block diagram of a document management system where this invention could be practiced.

FIG. 1 shows a document management system for managing documents in an information processing system. A user 20 is permitted to store and retrieve documents from library 28. The library 28 is capable of being accessed simultaneously by other users and therefore represents a shared library. Unlike library 28, a user's personal or private documents are stored in local document storage 24. This local document storage 24 is usually not shared with other users. A user 20 accesses his local document storage 24 through the manager/requester 22. The manager/requester 22 also interfaces with the library server 26 which controls user's access to the library 28. When a user 20 files a document in the document library 28, the library server 26 must construct parameters or descriptors that describe the contents of the information being stored in the library.

Figure 2:
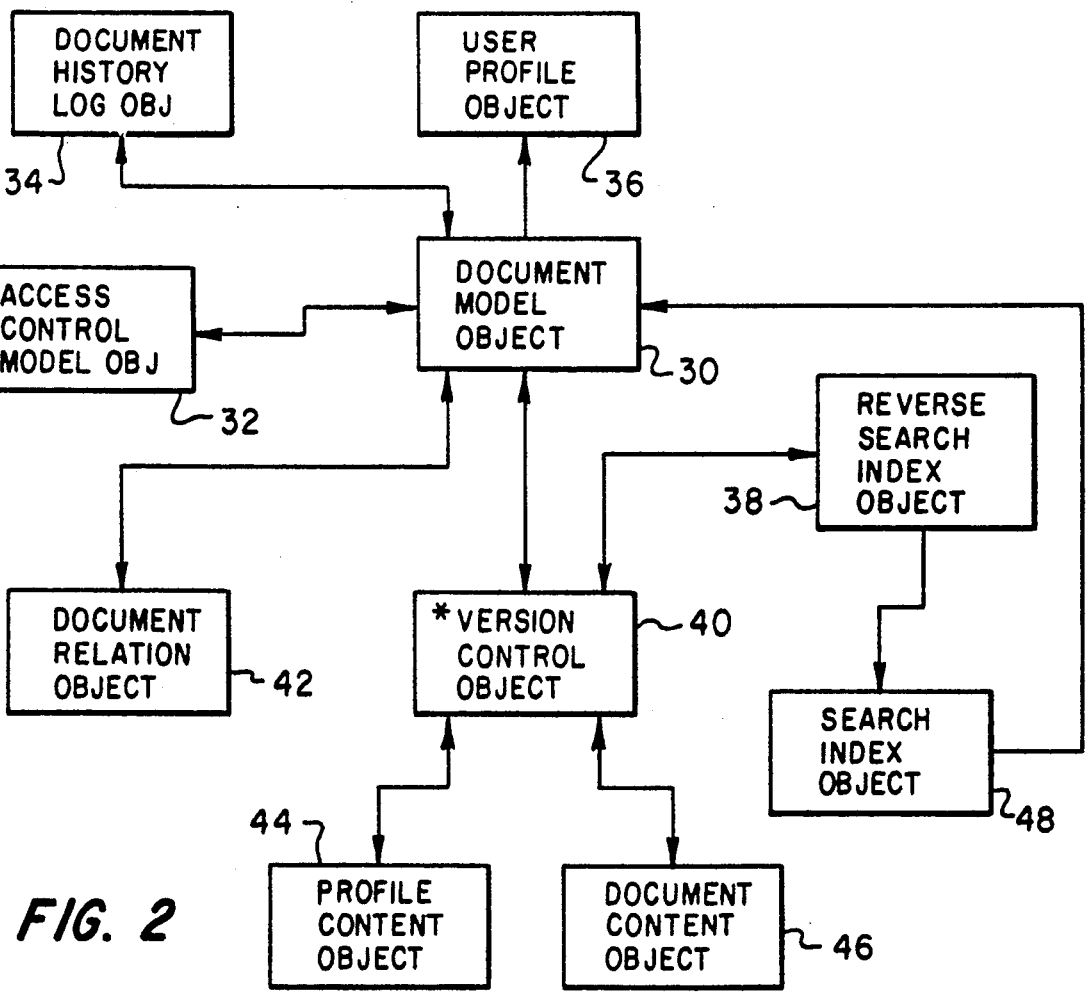
FIG. 2 is a basic document model created for each document filed in the library of the system shown in FIG. 1.

Referring to FIG. 2, a basic document model is shown for information stored in the library 28 shown in FIG. 1. This document model is created by the library server 26 and is stored with each document. While it is not necessary to implement the basic document model explicitly to support DIA library service architecture, there is the requirement that a design be mapped to these models, or to a subset of them.

The User Profile Object 36 (UPO) is not part of the DIA document model, but is instead an object referred to by the DIA document model. The User Profile Object 36 is created when the users they represent are logged members of an Office System Network. It identifies a user and contains information about the user such as aliases, services authorized to the user, default accounting information, and other user-specific information.

The Document Model Object 30 is the heart of the DIA document model and is logically the first object created when a document is filed for the first time in a document library. It contains information concerning ownership and attributes of a particular document. More specifically, it contains document instance attributes, such as whether the document is editable or not-editable; the maximum number of versions; and the action to be taken if the user has attempted to edit a document that cannot be edited. In addition, the Document Model Object 30 may contain any of the following information:

1) Document level locking information indicating the user who has checked a document out of the library for updating;
2) Indications that a document contents has been removed from direct control of the library server;
3) Directions to a library administrator to remove parts or restore parts of a document to library service control;
4) Time and date information was removed from direct control of the library server;
5) Location of information removed from direct control of the library server; and
6) Optional information for archival purposes.

The Access Control Model Object 32 (ACMO) is created when a document is filed for the first time into a DIA library. The principle purpose of the Access Control Model Object 32 is to consolidate information to be used in determining non-owner access to the document. It contains access control information such as whether the document is capable of being accessed by any one (public), whether access is permitted to a limited number of explicitly specified users (private), or whether the information is shared with others. The Access Control Model Object 32 also contains information that governs the retention and disposal of the document.

The Document History Log Object 34 (DHLO) is optionally created when a document is filed in the library and the user wishes to record various activities on the document. For example, a user may wish to record the number of times the document was read and by whom.

The Document Relation Object 42 (DRO) is created when a document is first filed in the library. Its purpose is to describe the logical relationships between a document and other related or grouped documents. For example, the DIA architecture allows folder documents to be created that contain other documents. When such a relationship exists, then each document contained within the folder has a pointer entry called a Library Assigned Document Name (LADN) in the Document Relation Object 42.

The Version Control Object 40 (VCO) is created when a document is first filed into the library and contains information for several objects that may comprise a single named version of a document. It provides space for version naming, version level locks, and other version related level process controls.

The Profile Content Object 44 (PCO) is created when a document is first filed into the library and a user wishes to create sub-objects for performance or other reasons. The Profile Content Object 44 is the repository for Profile information related to the sub-objects.

The Document Content Object 46 (DCO) is created when a document is first filed into the library and provides storage for the document contents. In addition, the Document Content Object 46 provides storage for saving information concerning the actual size of the document in various units of measurement.

The Search Index Object 48 (SIO) contains entries used in searching within a document. The entries are placed in the SIO as a result of the following sequence of actions on other objects. The basis Document Model Object 30 is first created as part of processing a FILE command. The Library Server then scans the Profile Content Object 44, the Document Relation Object 42, and the Access Control Model Object 32 to find terms to be used to support a parametric SEARCH. As each search term is identified, an entry is made in the Search Index Object 48 whose name includes the parametric search term value and semantics. If no SIO 48 exists when the Library Server scans the aforementioned objects, one is created and the entries placed therein as if the Search Index Object 48 always existed.

The Reverse Search Index Object 38 (RSIO) exists to support the removal of Search Index Object 48 entries when a document is removed from the library by a DELETE command. Entries for parametric search terms are placed in the RSIO 38 at the same time they are being made in the Search Index Object 48.

Referring to FIG. 3, a document relationship representing a folder is shown. Document A (56) and document B (54) represent individual items contained in folder document 1 (50). Document A (56) is also contained in folder document 2 (52) along with document C (58). Folder document 1 (50) and folder document 2 (52) might be individual personnel jackets and document A (56) might be a document explaining a personnel policy. Only one actual copy of document A 56 is needed and that copy is always consistent across personnel jackets. The relationship between the documents and the folders are contained in the Document Relation Object (DRO). Access to the documents in each folder requires the Library Server access the Document Relation Object of each document to determine the relationship.

Turning to FIG. 4, expansion of the document in a folder concept is shown to include a folder in a folder. Document A (56) and document B (54) are items in folder document 2 (52). Folder document 2 (52) is then placed into folder document 1 (50). For example, folder document 1 (50) may be a corporate opinion survey report while document 2 (52) may be the Austin survey report. Document A (56) and document B (54) may be survey reports from two different areas in Austin. Again, each time the Library Server accesses the documents shown in this relationship, the Document Relation Object for each of the items must be examined.

Referring to FIG. 5, another document relationship is shown where one document is stapled to another. Document 1 (60) is stapled to document 2 (62) which is stapled to document 3 (64). The staple relationship allows the user to attach two documents together. The Document Relation Object (DRO) for each document contains the current state of the relationship.

Further examples of various combinations of staple and folder relationships are shown in FIG. 6. Document 1 (60) and document 2 (62) may be stapled together and placed in folder document 1 (50) along with document 4 (66). In the same manner, document 3 (64) may be stapled to document 2 (62) and placed in folder document 2 (52). Also included in folder document 2 (52) is document 5 (68). Each document within the folder contains its own particular attributes such as language, document type, character type, character sets and other profile information which describes the characteristics of the document itself. In order to access documents within the folder, the Library Server has to read and decipher each document's profile to determine the attributes of all documents within the relationship. For example, if all documents in the relationship were composed in French, each document would have profile information specifying that the document was in French. This invention eliminates the problems of having to store this attribute information in every document through the creation of a "Vector-Relational Characteristical Object" (VRCO).

Figure 7:
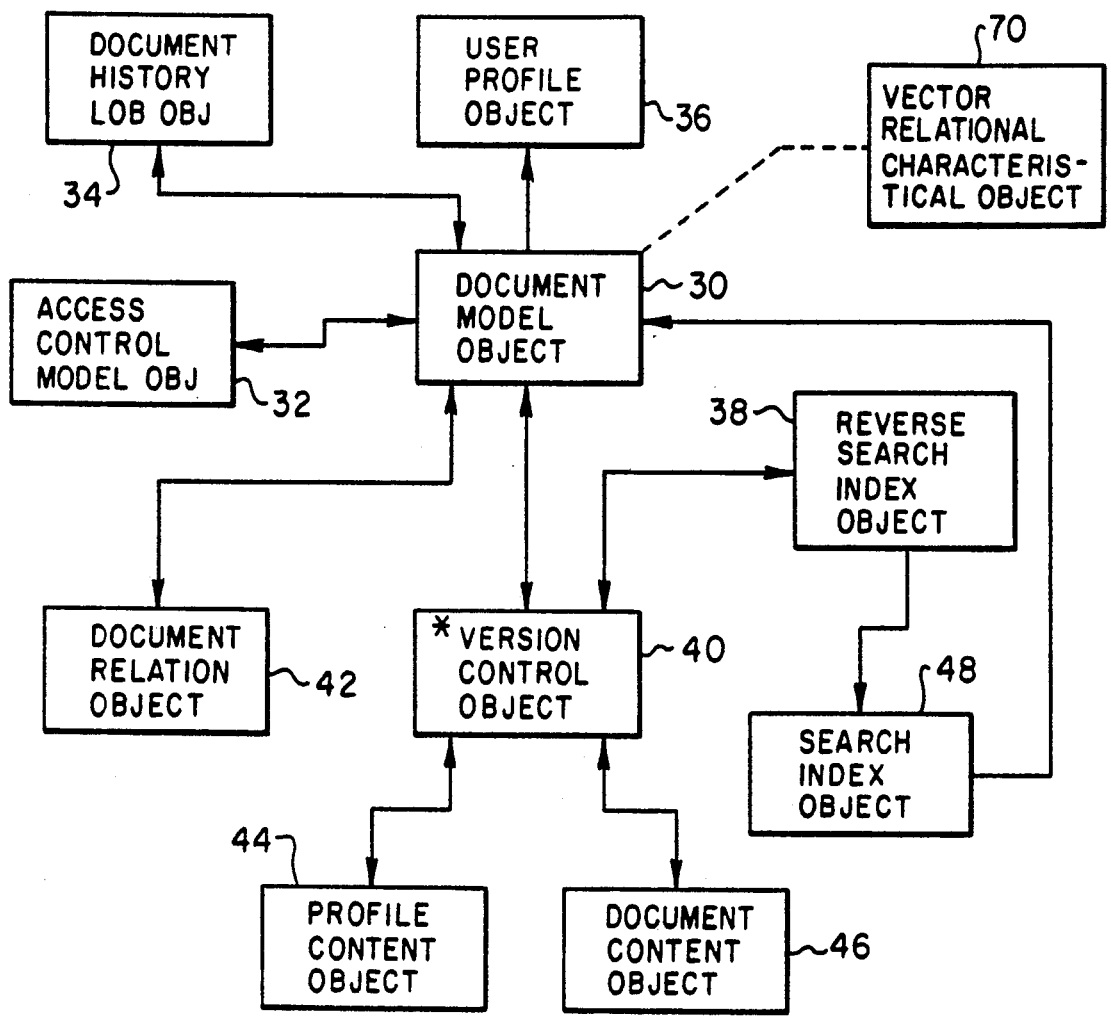
FIG. 7 shows the basic document model of FIG. 2 with the addition of the Vector Relational Characteristical Object in accordance with the method of the invention.

Turning to FIG. 7, the basic document model for the DIA Document Library Services is shown with the Vector-Relational Characteristical Object 70 (VRCO) of this invention. The VRCO 70 contains fields to identify a particular attribute which exist for at least one of the documents in a relationship. The fields are followed by identifiers which uniquely identify the documents which possess the particular attributes.

Figure 8:
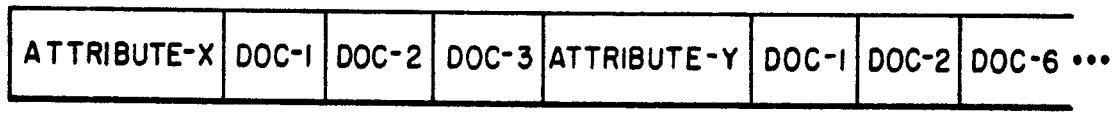
FIGS. 8 and 9 are structures for a field in the Vector-Relational Characteristical Object.
Figure 9:
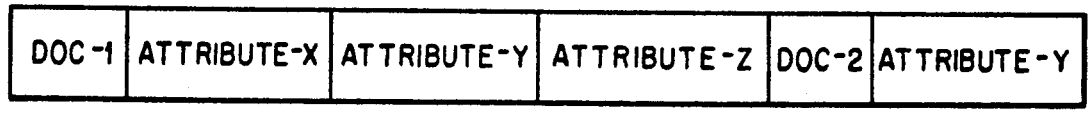

FIGS. 8 and 9 are typical examples of how the fields appear in the VRCO 70. Referring to FIG. 8, if documents 1, 2, and 3 all possess attribute X, and documents 1, 2, and 6 attribute Y, the Vector-Relational Characteristical Object (VRCO) would contain the fields shown in FIG. 8. There is no need to specify in the profile of each of the documents attributes X and Y since the VRCO already contain the information. The occurrence of a new attribute indicates the end of all documents that possess the previous attribute.

This invention permits the Library Server to rapidly access the attributes of documents which are in relationships to each other when requested by an application by reading the VRCO. Thus, the relationship of documents to each other can be rapidly accessed when such relationships are stored in the VRCO. The concept of placing attributes/characteristics that require rapid access in a VRCO are more clearly shown in the following example. Suppose an application was only capable of understanding a particular character set for the contents of a document. The application could quickly scan the VRCO, checking for documents that possess that particular character set. The application could then present only those documents to the user for presentation and ignore or delete documents for which the application does not support. Therefore, this invention permits applications to rapidly free up resources for documents which possess characteristics for which the application can not support.

The Vector-Relational Characteristical Object (VRCO) can also contain a VECTOR-BASE value to specify if the vector is to be based off of an attribute, or off the document identifier. FIG. 9 more clearly illustrates how the fields would appear in the VRCO. The VECTOR-BASE field contains a value to indicate if the vector is based off the document identifiers or the document attributes. Document 1 has attributes X, Y, and Z and document 2 has the Y attribute. The variability of basing the vector off the document can save storage when the number of documents is relatively large in relationship to the number of attributes defined, as shown in FIG. 9.

Figure 10:
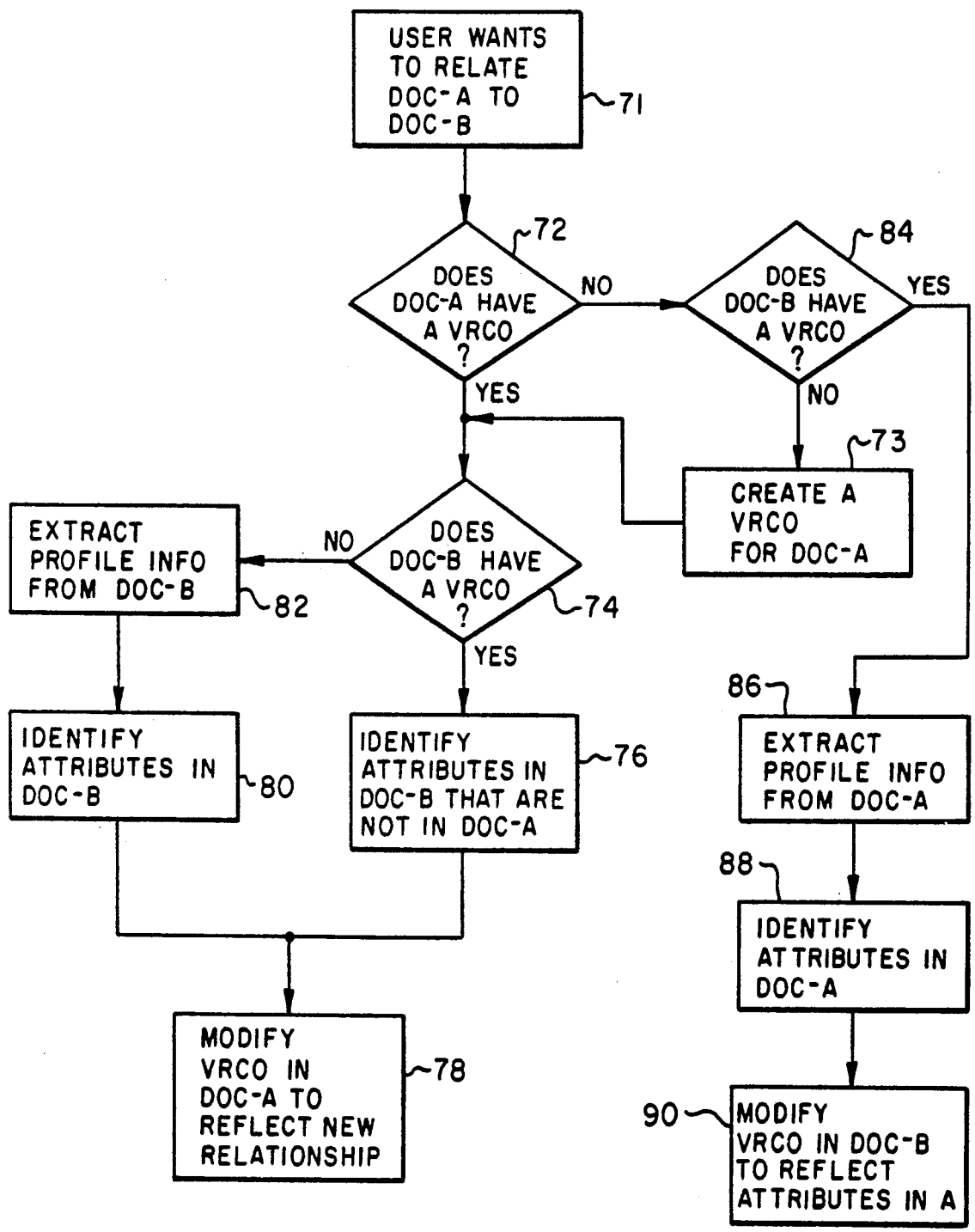
FIG. 10 is a flow diagram showing how the Vector-Relational Characteristical Object can be used within a document Interchange Management System of FIG. 1.

Referring to FIG. 10, a flow diagram is shown for Vector-Relational Characteristical Object usage. In step 71, a user decides to create a relationship between document A and document B. It is first determined in step 72 if document A has a VRCO. If document A already has a VRCO, we next determine in step 74 if document B possess a VRCO. In step 76, if both documents already contain a Vector-Relational Characteristical Object, we identify any attributes in document B that are not in document A. The VRCO analysis is completed by modifying the VRCO, step 78, of document A to reflect the new relationship between the documents. Only one VRCO will exist to define the relationship between the documents.

If the user finds after deciding to form a relationship between document A and document B that no VRCO exist for document A. Step 84 requires a determination of whether a VRCO exists for document B. When document B is found to have a VRCO, profile information is extracted in step 86 from document A and placed in the VRCO of document B. Attributes from document A are also identified in step 88 and placed in the VRCO of document B. Finally, the document B VRCO is modified in step 90 to reflect the attributes in document A. This method provides for one VRCO per relationship. No matter how many documents are created in the relationship, only one VRCO exist for the relationship. This significantly reduces the amount of storage, necessary to retain attributes of a document.

In the same way, if a VRCO exists for document A and not for document B, profile information is extracted in step 82 from document B. Attributes are identified in document B, step 80 and the VRCO for document A is modified to reflect the new relationship between the documents in step 78.

Finally, if neither document has a VRCO associated with it, step 73 requires the creation of a VRCO for document A. In step 82, profile information is extracted from document B and placed in the VRCO. In step 80, attributes for document B are identified and placed in the VRCO. In step 78 the VRCO for document A is modified to reflect the new relationships between document A and document B.

In summary, this invention discloses a method of identifying document attributes when a plurality of documents are combined in unique document relationships. These document relationships include folders, staple documents, various combinations of the folder and staple concepts, or any relationship where documents within a relationship contain at least one similar attribute. A Vector Relational Characteristical Object (VRCO) is added to the set of objects forming the basic document model as implemented in the Document Interchange Architecture (DIA). The Vector Relational Characteristical Object is available to document access mechanisms and contains fields for specifying the attributes once for each document in a relationship. The VRCO reduces storage requirements by providing for storage of the attribute only once when the document relationships are created. The VRCO contains a field to identify a particular attribute which exist for at least one of the documents in the relationship. The field is then followed by an identifier which uniquely identifies the document which possess the particular attribute. Since the attribute is stored only once and in a single object, it can be rapidly accessed to determine if an attribute exist for a particular document.

While the invention has been particularly shown and described with reference to preferred embodiments thereof, it will be understood by those skilled in the art that various changes in form and detail may be therein without departing from the spirit and scope of the invention.

What I claim is:

1. A method of identifying a document attribute of a first and second documents stored in a shared library having a plurality of documents stored therein, and where said first and second documents are combined to form a document relationship, comprising the steps of:

identifying said first and second documents in said document relationship;

creating a vector relational characteristical object containing the document attribute of said first and second documents; and storing said vector relational characteristical object in said shared library with at least one of said first and second documents.

2. A method of identifying a document attribute associated with a first and second documents stored in a shared library in a document management system where a plurality of documents are stored in said shared library, and where said first and second documents form a document relationship, said method comprising the steps of:

identifying said first and second documents in said document relationship;

storing said document attribute in a vector relational characteristical object; and storing said vector relational characteristical object with at least one of said first and second documents in said shared library.

3. A method of identifying a document attribute resulting from a formation of a document relationship between a first document and a second document stored in a shared library within a document management system, said shared library having a plurality of documents and said plurality of documents are accessed by a user, comprising the steps of:

identifying by said user said first document and second document in said document relationship;

fetching said first document and said second document from said shared library and removing said document attribute from a profile object for said first document and said second document;

creating a vector relational characteristical object and placing said document attribute from said profile object for said first document and second document in said vector relational characteristical object; and storing said vector relational characteristical object with at least one of said first document and second document in said shared library.

* * * * *